United States Patent [19]
Fitzpatrick et al.

[11] Patent Number: 5,665,229
[45] Date of Patent: Sep. 9, 1997

[54] IN-TANK FUEL FILTER WITH FLOATING MOUNTING

[75] Inventors: Edward J. Fitzpatrick, Findlay; Michael J. Davidson; Bernard R. Smith, both of Ottawa, all of Ohio

[73] Assignee: Kuss Corporation, Findlay, Ohio

[21] Appl. No.: 499,175

[22] Filed: Jul. 7, 1995

[51] Int. Cl.[6] .................................................. B01D 35/02
[52] U.S. Cl. ........................ 210/232; 210/461; 210/486; 210/499
[58] Field of Search ................................. 210/172, 232, 210/416.4, 460, 461, 486, 499; 411/918; 285/340

[56] References Cited

U.S. PATENT DOCUMENTS

| | | | |
|---|---|---|---|
| 2,484,192 | 10/1949 | Squiller | 285/161 |
| 2,621,947 | 12/1952 | Markvart | 287/53 |
| 2,689,146 | 9/1954 | Werner | 287/52 |
| 2,913,950 | 11/1959 | Tinnerman | 411/918 |
| 3,007,726 | 11/1961 | Parkin | 287/53 |
| 3,875,059 | 4/1975 | Maschino | 210/172 |
| 4,312,753 | 1/1982 | Bell | 210/250 |
| 4,617,121 | 10/1986 | Yokoyama | 210/416.4 |
| 4,783,260 | 11/1988 | Kurihara | 210/232 |
| 5,049,271 | 9/1991 | Cain | 210/460 |
| 5,055,187 | 10/1991 | Ito et al. | 210/172 |
| 5,174,841 | 12/1992 | Combest | 156/73.1 |

FOREIGN PATENT DOCUMENTS 4026230  10/1991  Germany ............... 210/172

*Primary Examiner*—Matthew O. Savage
*Attorney, Agent, or Firm*—Brinks Hofer Gilson & Lione

[57] ABSTRACT

An in-tank fuel filter for securement to an in-tank fuel pump assembly includes a retaining or mounting ring which is utilized to secure the filter to the fuel pump assembly inlet. The mounting ring includes a collar which is received about the outlet stack of the fuel filter assembly and assists retention of the fuel filter assembly on the fuel pump inlet and maintains a fluid tight seal notwithstanding dimensional changes of the outlet stack occasioned by long term contact with fuel. The fuel pump assembly also includes a depending lug parallel to but offset from the inlet fitting. The mounting ring also includes complementary means to receive and grip the lug, namely, a plurality of resilient fingers arranged in a non-circular, i.e., elongate pattern such as an oval which compensates for inlet fitting to lug spacing variations and retains the fuel filter on the fuel pump assembly during subsequent manufacturing and assembly steps. In an alternate embodiment, the mounting ring collar and resilient fingers comprehend individual components.

18 Claims, 3 Drawing Sheets

5,665,229

IN-TANK FUEL FILTER WITH FLOATING MOUNTING

BACKGROUND OF THE INVENTION

The invention relates generally to in-tank fuel filters for installation on in-tank fuel pump assemblies and more specifically to an in-tank fuel filter having a retaining structure comprising a plurality of spring fingers arranged in an elongated circle. This configuration of fingers ensures ready mounting and retention of the filter assembly on the fuel pump assembly in spite of dimensional variation of filter mounting components on the fuel pump assembly.

The sophistication of modern vehicle fuel systems, particularly fuel injection systems, necessitates a supply of the cleanest possible fuel to such systems. Cleanest is currently defined as carrying contaminants such as foreign particulate matter having a size of less than about 100 microns. In order to satisfy the cleanliness requirements of such fuel systems, vehicle manufacturers have adopted two stage filtration schemes utilizing a first, relatively coarse fuel filter disposed in the fuel tank and a second finer, replaceable fuel filter in the engine compartment.

The in-tank fuel filter is generally assembled to the in-tank fuel pump assembly and this assembly is then mounted as a unit into the fuel tank.

Although the fuel filter will generally be retained upon the fuel pump assembly inlet simply by its position adjacent or against the bottom of the fuel tank once the assembly has been installed in the tank, maintaining the fuel filter in position after assembly and during transfer, storage and final installation into the fuel tank presents challenges. First of all, the fuel filter is preferably oriented in a specific radial direction on the fuel pump assembly inlet. Thus, a locating tab or other structure must be utilized. If such a locating tab is utilized, particularly as an integral feature of the fuel pump inlet fitting, experience has shown that providing a mating, properly configured structure for the positioning tab is problematic. Even very small dimensional variations in the sizes of such components may render assembly difficult or create a small gap through which unfiltered fuel may pass. Furthermore, the retaining structure must provide tight securement as the filter and fuel pump assembly will be handled several times before it is installed and protected in the fuel tank. Accordingly, the filter securement structure must be capable of withstanding repeated and relatively random and unpredictable dislodging forces.

Another problem common to in-tank filters is the tendency of the components, which are typically fabricated of a plastic such as nylon, polyester or acetal, to swell slightly upon prolonged exposure to hydrocarbon fuels, alternative fuels and their various additives. As noted above, since an in-tank fuel filter generally rests upon the fuel tank bottom, swelling of the outlet fitting will not result in dislodging of the fuel filter. However, since the fuel pump inlet fitting is typically fabricated of metal and is thus relatively dimensionally stable, such swelling will often create a gap between the filter fitting and the inlet fitting. If such swelling occurs, the effectiveness of the fuel filter will be seriously compromised.

Finally, it is desirable that the fuel filter securement structure not include small or loose parts that must be carefully handled and delicately assembled as this complicates and slows assembly of the fuel filter on the fuel pump assembly.

In view of the foregoing, it is apparent that improvements in the art of in-tank fuel filters and particularly those for installation on in-tank fuel pump assemblies which address these problems would be highly desirable.

SUMMARY OF THE INVENTION

An in-tank fuel filter for securement to an in-tank fuel pump assembly includes a retaining or mounting ring which is utilized to secure the filter to the fuel pump assembly inlet. The mounting ring includes a collar which is received about the outlet stack of the fuel filter assembly and assists retention of the fuel filter assembly on the fuel pump inlet and maintains a fluid tight seal notwithstanding dimensional changes of the outlet stack occasioned by long term contact with hydrocarbon or alternative fuels and their various additives.

The fuel pump assembly also includes a depending lug parallel to but offset from the inlet fitting. The mounting ring also includes complementary means to receive and grip the lug, namely, a plurality of resilient fingers arranged in a non-circular, that is, elongate or oval pattern which effectively compensates for inlet fitting to lug spacing variations and retains the fuel filter on the fuel pump assembly during subsequent manufacturing and assembly steps. An alternate embodiment, wherein the mounting ring collar and resilient fingers comprehend individual components, is also disclosed.

Thus it is an object of the present invention to provide an in-tank fuel filter having a mounting ring which secures the filter on a fuel pump assembly and accepts dimensional variations in components of such fuel pump assembly.

It is the further object of the present invention to provide an in-tank fuel filter having a combination mounting ring and outlet collar.

It is a still further object of the present invention to provide an in-tank fuel filter having a mounting ring with a plurality of spring fingers arranged to define an elongated circle or oval which provides a self-compensating fuel filter retainer.

It is a still further object of the present invention to provide an in-tank fuel filter which compensates for inlet fitting to mounting lug spacing variations on fuel pump assemblies.

It is a still further object of the present invention to provide an in-tank fuel filter mounting wherein a collar and retainer with spring fingers are formed as a unitary component.

It is a still further object of the present invention to provide an in-tank fuel filter mounting wherein a collar and retainer with spring fingers comprise individual components.

Further objects and advantages of the present invention will become apparent by reference to the following description of the preferred and alternate embodiments and the appended drawing figures wherein like numerals refer to the same element, component or feature.

DESCRIPTION OF THE PREFERRED AND ALTERNATE EMBODIMENTS

Figure 1:
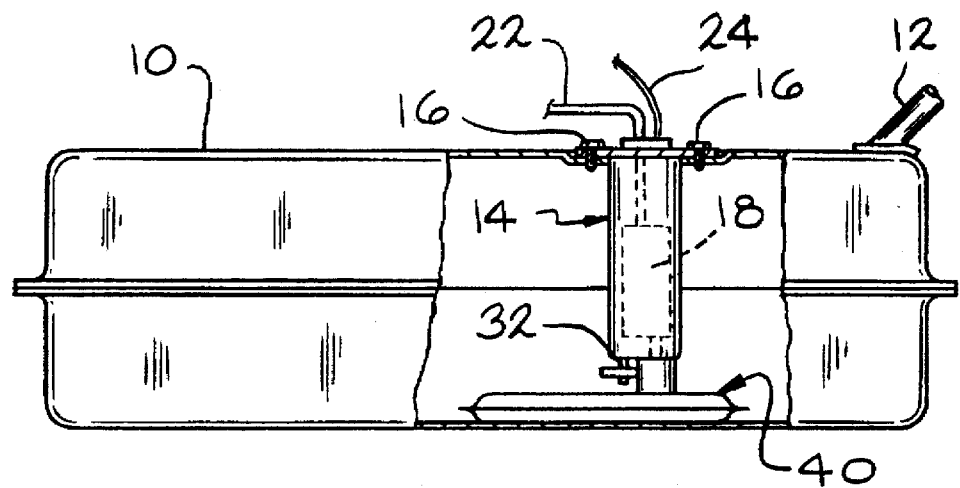
FIG. 1 is an elevational view of a typical vehicle fuel tank with a portion broken away to expose an in-tank fuel pump assembly and fuel filter according to the present invention.

Referring now to FIG. 1, a typical vehicle fuel tank is illustrated and generally designated by the reference numeral 10. The vehicle fuel tank 10 is typically fabricated of formed, welded metal or blow molded plastic and includes an inlet or fill pipe 12 which receives fuel such as gasoline, gasohol or other alternative fuel from a source exterior to the vehicle and directs it to the interior of the vehicle fuel tank 10 as will be readily understood. The fuel tank 10 also typically includes an electric fuel pump assembly 14 which is sealingly mounted within the vehicle fuel tank 10 and secured to the fuel tank 10 by a plurality of threaded fasteners 16. The fuel pump assembly 14 includes a fuel pump 18 which provides fuel under pressure to a fuel outlet line 22. A cable 24 having one or two conductors provides electrical energy to the fuel pump 18 in accordance with conventional practice.

Figure 3:
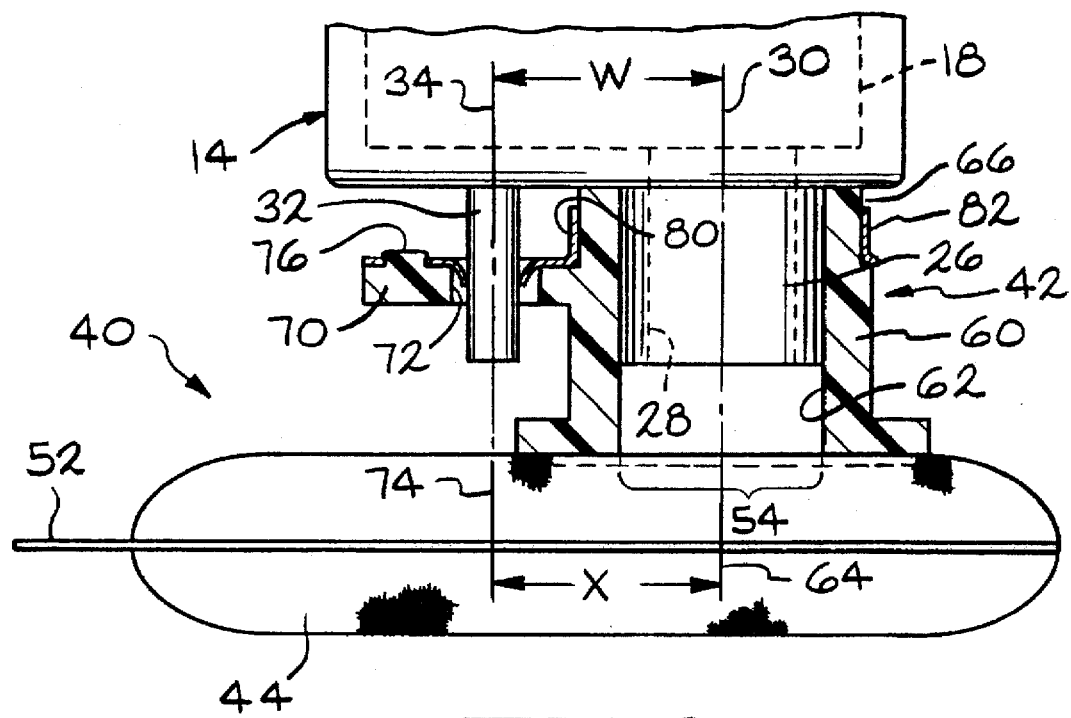
FIG. 3 is an enlarged, full sectional view of an in-tank fuel filter, inlet stack and mounting ring according to the present invention.

As illustrated in FIGS. 1 and 3, the fuel pump assembly 14 also includes a depending, preferably cylindrical suction or inlet fitting 26 which defines an inlet opening 28 in fluid communication with the inlet of the fuel pump 18. The cylindrical inlet fitting 26 defines a reference center axis 30. Radially spaced from the inlet fitting 26 and its center axis 30 and disposed parallel thereto is a positioning and mounting lug 32. The mounting lug 32 is preferably cylindrical and depends from and is secured to or integrally formed with the bottom portion of the fuel pump assembly 14. The mounting lug 32 defines a reference center axis 34 which is parallel to and nominally spaced from the reference center axis 30 of the inlet fitting 26 a reference distance "W."

Figure 2:
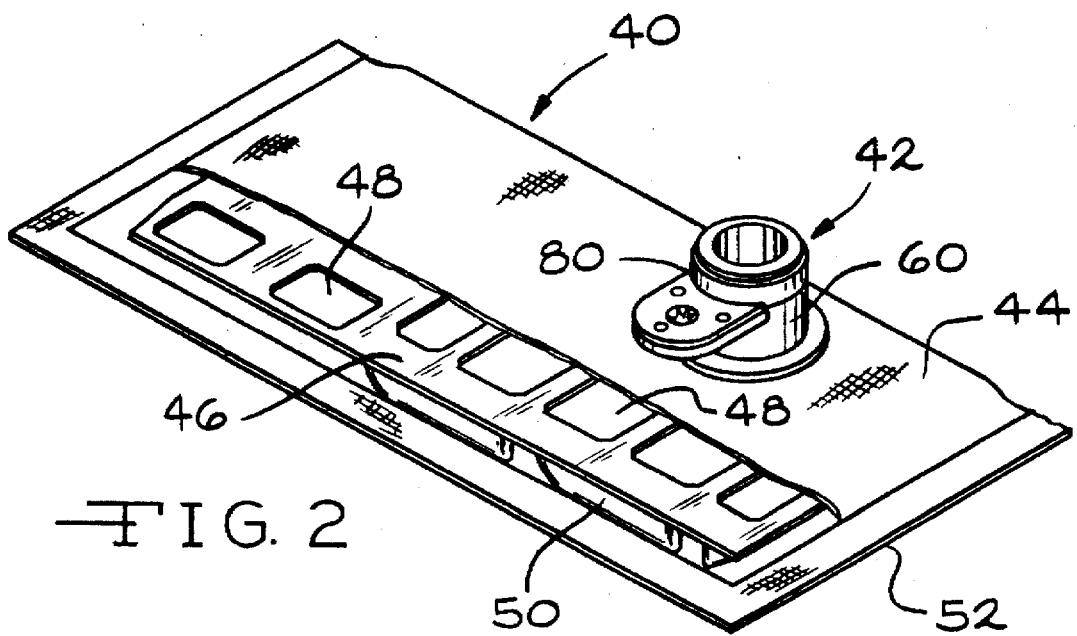
FIG. 2 is a perspective view of an in-tank fuel filter and mounting ring according to the present invention.

With reference now to FIGS. 1, 2 and 3, disposed generally on the bottom of the vehicle fuel tank 10 and secured both about the inlet fitting 26 and to the mounting lug 32 is a fuel filter assembly 40. The fuel filter assembly 40 includes an outlet stack 42 and a folded filtration mesh or fabric body 44. The fabric body 44 comprises a folded swatch of nylon, polyester or acetal woven material or multi-layer polymeric depth media. Typical pore size of the fabric body 44 and thus maximum particle size passed through the filtration fabric is on the order of from 50 to 100 microns. A molded plastic separator or spacer 46 is disposed within the interior of the folded fabric body 44 and includes randomly sized and disposed openings 48 and spacing lugs 50. The spacer 46 may also take the form of a stuffer which is generally defined as an insert of open cell foam material or a swatch of folded or rolled fabric. The spacer 46 facilitates fuel flow within the interior of the filter assembly 40, preventing collapse of the adjacent layers of the folded fabric body 44 which would otherwise occur due to the suction of the fuel pump assembly 14. Such collapse inhibits filtration action over the full surface of the fabric body 44 and is to be avoided.

As noted, the filtration fabric of the body 44 is folded along one edge. Along the three remaining unfolded but juxtaposed edges 52, the upper and lower fabric layers are aligned and the fabric is melted and merged to form a tight seal therebetween by infrared, ultrasonic or radio frequency autogenous bonding. Alternatively, a suitable adhesive may be applied to an edge adjacent region of one layer to secure the juxtaposed edges 52 to one another.

The outlet stack 42 is preferably formed on one face of the fabric body 44 by in-situ molding. An aperture 54 is first formed in the fabric at an appropriate location. The fabric body 44 is then placed in a suitably configured die cavity of an injection molding machine (not illustrated) and an injection moldable media such as nylon, polyester, acetal or other plastic is injected into the die cavity to form the outlet stack 42. The edge of the fabric body 44 adjacent the aperture 54 is enveloped by the molding media such that an intimate mechanical seal is formed between the fabric 44 and the molding media which forms the outlet stack 42. Alternatively, the outlet stack 42 may be fabricated in one or more pieces and then secured to the fabric body 44 about the aperture 54 with an adhesive or as shown in, for example, U.S. Pat. No. 5,174,841 to John F. Combest which is hereby incorporated by reference.

The outlet stack 42 generally comprises an upright cylindrical member 60 defining a through fuel passageway 62 which communicates with the interior of the fabric body 42. The fuel passageway 62 is also preferably cylindrical and defines a reference center axis 64. Adjacent its upper terminus, the cylindrical member 60 defines a reduced diameter neck region 66. A shoulder 68 which demarcates the neck region 66 is coplanar with the upper surface of a single, radially extending vestigial flange or ear 70. The ear 70 defines a centrally disposed through opening 72 having a reference center axis 74 which is spaced from the reference center axis 64 of the outlet fitting 42 a distance "X" approximately equal to the distance "W" between the center axis 30 of the inlet fitting 26 and the center axis 34 of the mounting lug 32 of the fuel pump assembly 14. The ear 70 includes a plurality, preferably three, spaced apart posts or stanchions 76 which project a short distance above the upper surface of the ear 70.

Disposed about the reduced diameter neck region 66 of the outlet stack 42 and on the upper surface of the tab 70 is a retaining or mounting ring 80. The mounting ring 80 is preferably fabricated of stainless steel, such as 304SS, or other rigid, stable material. The mounting ring 80 includes an annular collar 82 having an inside diameter slightly more than the outside diameter of the reduced diameter neck region 66 of the outlet stack 42 such that it may be disposed thereupon by an interference or friction fit. The center of the annular collar 82 is coincident with the reference center axis 64. The mounting ring 80 also include a plurality, preferably three, apertures 84 which are sized and arranged to receive the posts or stanchions 76 on the ear 70 when the mounting ring 80 is properly registered and positioned upon the neck region 66 of the outlet stack 42. The posts or stanchions 76 may then be upset by a staking operation or melted by the application of heat through infrared, ultrasonic, radio frequency or direct contact processes to retain the mounting ring 80 thereupon.

Finally, the mounting ring 80 includes an aperture 86 generally centered among the plurality of apertures 84. The interior of the aperture 86 defines a plurality of a obliquely oriented locking tabs or fingers 88 which generally point toward the fabric body 44 of the filter assembly 40. The tabs or fingers 88 are stiffly resilient, that is, exhibit the characteristics of a spring. In their relaxed positions illustrated in FIG. 4, their inner edges 90 define a region somewhat smaller than the outside diameter of the mounting lug 32. Accordingly, when the mounting lug 32 is inserted into the region defined by the fingers 88, they contact the mounting lug 32, deflect and grip it.

Figure 4:
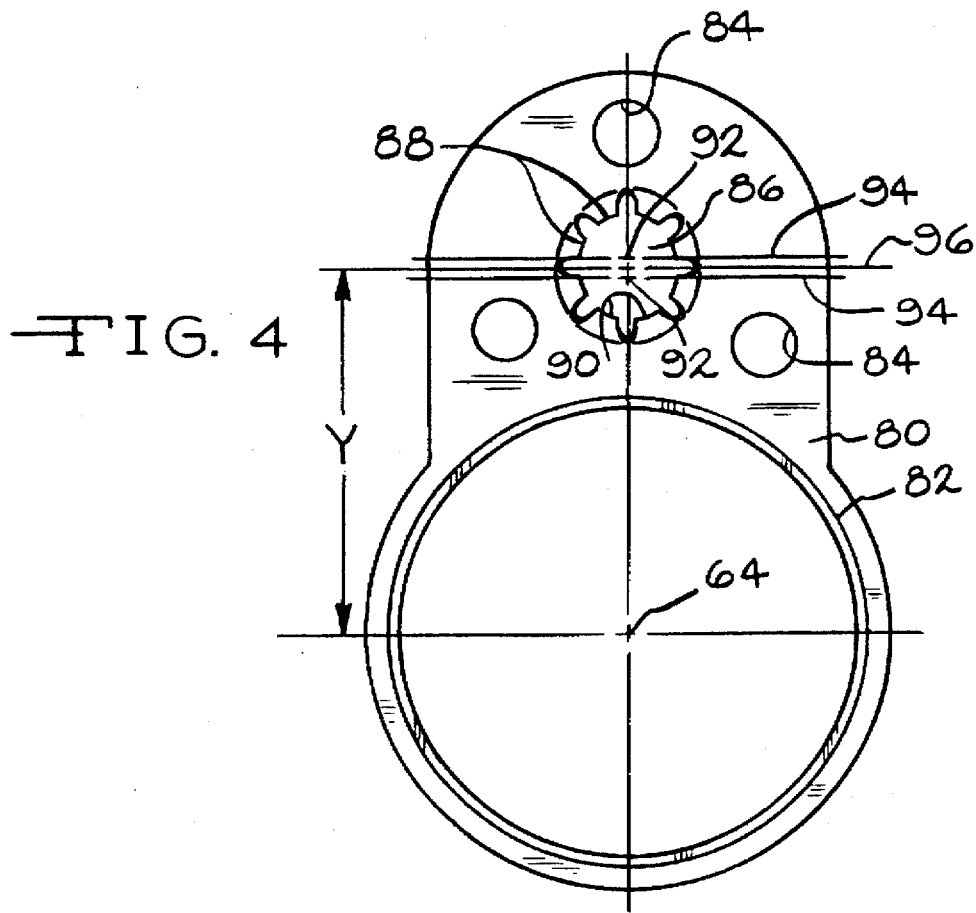
FIG. 4 is an enlarged, top plan view of a mounting ring according to the present invention showing the elongated circular or oval aperture.

The inner edges 90 of the tabs 88 define a non-circular edge which may alternately be described as elongated circle or an oval or race track like shape with two displaced or spaced apart centers 92 residing at the intersections of the reference lines 94 and a reference line of radius of the center axis 64 of the cylindrical member 60 of the outlet stack 42. In a typical mounting ring 80 for use with a mounting lug 32 having a diameter of about 3.5 millimeters to 4.0 millimeters, the displacement of each of the centers 92 and the reference lines 94 away from what would otherwise be the center of the circle on reference line 96 is between about 0.10 and 0.20 millimeters. Thus, the spacing between the reference center axis 64 of the mounting collar 82 (and the outlet stack 60) and the reference center axis 96, which distance is designated by the reference letter "Y" in FIG. 4, is effectively increased and decreased by between about 0.10 and 0.20 millimeters to accommodate variability in the distance "W" illustrated in FIG. 3 which, as noted above, is the distance between the center axis 30 of the inlet fitting 26 of the fuel pump assembly 14 and the center axis 34 of the mounting lug 32.

Thus, the figure discontinuously defined by the inner edges 90 of the tabs 88 is generally oval, having two equal radius (or diameter) semi-circles at each end connected by straight edges having a length of from between about 0.20 millimeters to 0.40 millimeters. Larger or smaller fuel pump assemblies having mounting lugs with different cross-sections such as square or hexagonal or larger or smaller mounting lugs 32 and likely greater or lesser manufacturing tolerances will require correspondingly larger or smaller offsets of the centers of the fingers 88 and interior edges 90 or slightly different shapes corresponding to the exterior of the mounting lugs to provide accommodation to such shapes and the larger or smaller tolerances.

It will therefore be appreciated that unit to unit variations in the spacing between the reference center lines 30 and 34, that is, variation in the distance "W" illustrated in FIG. 3, due to the manufacturing tolerances of the fuel pump assembly 14 is accommodated by the non-circular or oval configuration of the inner edges 90 of the tabs 88, which provide a designed-in accommodation capability. Hence, not only is proper registration of the fuel filter assembly 40 achieved by cooperation of the mounting lug 32 with the aperture 86 such that the fuel filter assembly 40 is properly oriented with respect to the fuel pump assembly 14 but also the elongate shape of the aperture 86 defined by the inner edges 90 of the fingers 88 assures that in spite of relatively significant variations of the dimension "w" between the axes of the inlet fitting 26 and mounting lug 32 from one fuel pump assembly 14 to the next, a sufficient number of fingers 88 will engage and grip the mounting lug 32. Thus, a fuel filter assembly 40 according to the present invention will be readily assemblable to and retained upon a typical in-tank fuel pump assembly 14 simply by properly aligning the two components and pushing them together.

It should also be noted that the mounting ring 80 and specifically the cylindrical portion 82 also serves to dimensionally stabilize the diameter of the cylindrical member 60 in spite of its tendency, if fabricated of certain plastic materials, to swell slightly when exposed to fuels and fuel additives over extended periods of time, thereby allowing the ingress of unfiltered fuel and contaminants into the fuel pump assembly 14. The annular collar 82 functions as a swell controlling band to dimensionally stabilize the diameter of the cylindrical member 60 and ensure that the interference fit between it and the inlet fitting 26 of the fuel pump assembly 14 is maintained.

Figure 5:
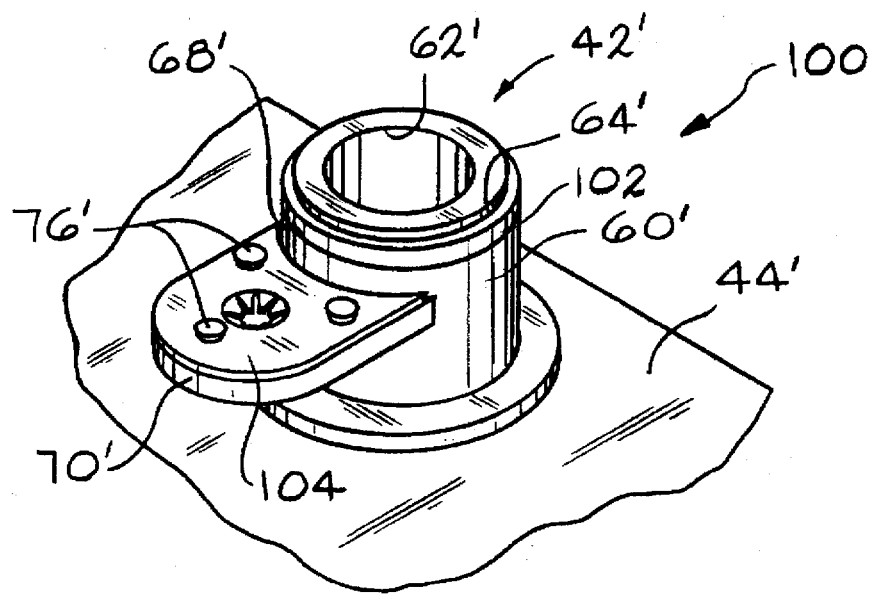
FIG. 5 is a perspective view of a first alternate embodiment collar and retainer disposed on the outlet stack of an in-tank fuel filter according to the present invention.
Figure 6:
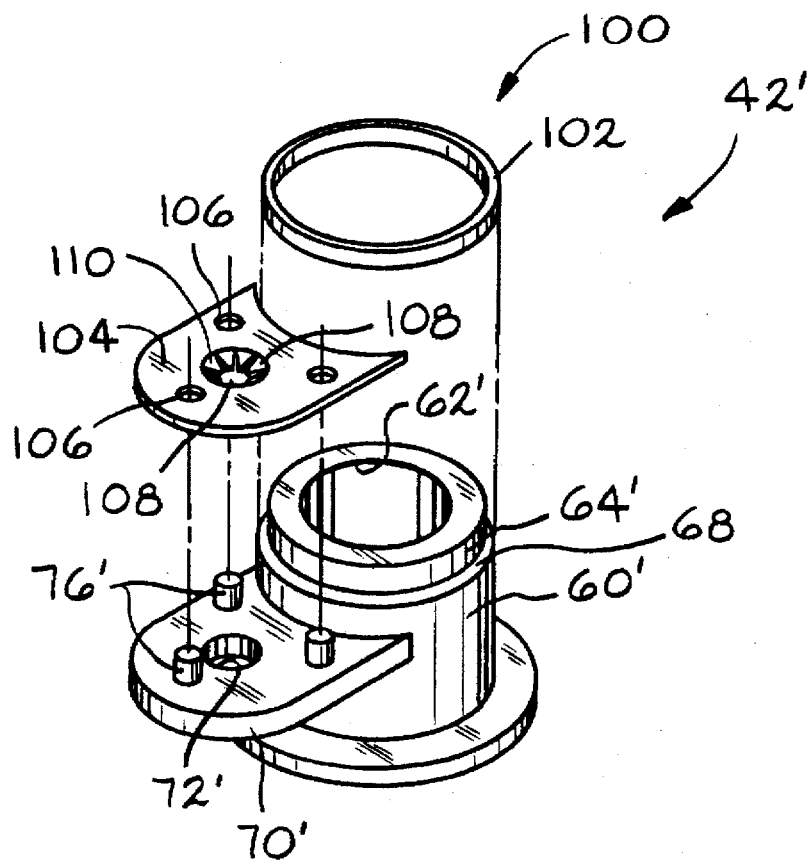
FIG. 6 is an exploded perspective view of the first alternate embodiment collar and retainer according to the present invention.

Turning now to FIGS. 5 and 6, a first alternate embodiment of the retaining ring 80 and filter assembly 40 is illustrated and generally designated by the reference numeral 100. The filter assembly 100 includes a fabric or mesh body 44' and an outlet stack 42 having an upright cylindrical member 60' with a fuel passageway 62' and reduced diameter neck region 64' and shoulder 68'. A single vestigial flange or ear 70' is disposed at an axially spaced apart distance from the shoulder 68' and includes a plurality, preferably three, upstanding posts or stanchions 76' as well as a through opening 72'.

In the first alternate embodiment filter assembly 100, an annular collar 102 fabricated of a stable material such as 304 stainless steel having an inside diameter slightly smaller than the diameter the reduced diameter neck region 64' is seated thereabout to ensure dimensional stability of the cylindrical member 60 such that swelling does not occur and the ingestion of unfiltered fuel and contaminates into the fuel system is prevented. A mounting plate 104 having arcuately curved edges is disposed upon the flange or ear 70'. The mounting plate 104 includes a plurality, preferably three, apertures 106 sized and arranged to receive the stanchions 76'. The mounting plate 104 is retained upon the ear 70' by suitable upset or melting of the stanchions 76' as described above with regard to the preferred embodiment filter assembly 40. The mounting plate 104 also includes an aperture 108 having a plurality of obliquely oriented tabs or fingers 110 which are identical to the fingers 88 and are identically arranged. Thus, the aperture 108 is generally non-circular or oval as defined above and the tabs or fingers 88 accommodate different separations (differences in the spacing "W") between the inlet fitting 26 and the mounting lug 32 of the filter pump assembly 14 while still tightly securing the filter assembly 100 to the fuel pump assembly 14.

The foregoing disclosure is the best mode devised by the inventors for practicing this invention. It is apparent, however, that devices incorporating modifications and variations will be obvious to one skilled in the art of fuel filtration assemblies. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An in-tank fuel filter assembly comprising, in combination,
   a filtration body defining an interior and an aperture,
   an outlet fitting secured to said filtration body about said aperture, said outlet fitting adapted to receive an inlet fitting of a fuel pump and provide communication with said interior of said filtration body, and
   a retainer secured to said outlet fitting and adapted to receive a mounting lug of such fuel pump, said retainer including a plurality of fingers having gripping ends arranged in a non-circular configuration, whereby said non-circular configuration of said plurality of fingers engages such mounting lug notwithstanding variations in spacing from such inlet fitting, wherein said retainer includes apertures and wherein said outlet fitting includes a flange having posts for engaging said apertures to secure said retainer to said outlet fitting.

2. The in-tank fuel filter assembly of claim 1 wherein said filtration body defines pore sizes ranging between 50 and 100 microns.

3. The in-tank fuel filter assembly of claim 1 wherein said non-circular configuration of said plurality of fingers is an oval having equal radius ends connected by straight portions.

4. The in-tank fuel filter assembly of claim 1 wherein said retainer includes a collar seated about a portion of said outlet fitting.

5. The in-tank fuel filter assembly of claim 1 wherein said outlet fitting is fabricated of plastic and wherein said retainer is fabricated of metal.

6. The in-tank fuel filter assembly of claim 1 wherein said non-circular configuration defines a longitudinal axis, and wherein said outlet fitting defines an axis passing through a center of said outlet fitting said longitudinal axis of said non-circular configuration intersecting said axis of said outlet fitting.

7. The in-tank fuel filter assembly of claim 1 wherein said filtration body is a fabric woven of material selected from the group consisting of nylon, polyester, acetal or combinations thereof.

8. An in-tank fuel filter assembly comprising, in combination, a filter body of filtration media defining an interior, and an aperture and at least one sealed edge portion, an outlet fitting secured to said filter about said aperture, said outlet fitting adapted to receive an inlet fitting of a fuel pump and provide communication with said interior of said filter body, and retaining means secured to said outlet fitting and adapted to receive a mounting lug disposed adjacent such inlet fitting of such fuel pump, said retaining means including a plurality of spring fingers having gripping ends arranged in an oval configuration, whereby said oval configuration of said plurality of fingers adjustably grips such mounting lug over a range of spacings from such inlet fitting, wherein said retainer means includes apertures and wherein said outlet fitting includes a flange having post for engaging said apertures to secure said retainer to said outlet fitting.

9. The in-tank fuel filter assembly of claim 8 wherein said retaining means is fabricated of metal.

10. The in-tank fuel filter assembly of claim 8 wherein said retaining means includes a collar seated about a portion of said outlet fitting.

11. The in-tank fuel filter assembly of claim 10 wherein said outlet fitting includes a neck region and said collar is an interference fit on said neck region.

12. The in-tank fuel filter assembly of claim 8 wherein said ends of said spring fingers define a straight, intermediate regions.

13. The in-tank fuel filter assembly of claim 8 wherein said filtration body defines pore sizes ranging between 50 and 100 microns.

14. An in-tank fuel filter assembly comprising, in combination, a filter body defining an interior, an aperture providing communication with said interior and at least one sealed portion, an outlet fitting secured to said filter body about said aperture, said outlet fitting adapted to receive an inlet fitting of a fuel pump and provide fluid communication with said interior of said filter body, and a retainer secured to said outlet fitting and adapted to receive a mounting lug disposed adjacent such inlet fitting of such fuel pump, said retainer including a plurality of spring fingers having gripping ends arranged in an elongate configuration having a longer dimension and a shorter dimension, said shorter dimension being smaller than the nominal size of such mounting lug, whereby said elongate configuration of said plurality of spring fingers accepts such mounting lug over a range of spacings from such inlet fitting, wherein said retainer includes apertures and wherein said outlet fitting includes a flange having posts for engaging said apertures to secure said retainer to said outlet fitting.

15. The in-tank fuel filter assembly of claim 14 wherein said outlet fitting defines a circular passageway having an axis and said longer dimension is coincident with a line of radius of said outlet fitting passageway and greater than nominal size of such mounting lug.

16. The in-tank fuel filter assembly of claim 14 wherein said retainer is fabricated of metal.

17. The in-tank fuel filter assembly of claim 14 wherein said retainer includes a collar seated about a portion of said outlet fitting.

18. The in-tank fuel filter assembly of claim 14 further including a spacer disposed in said interior of said filter body and wherein said filter body is a fabric woven of material selected from the group consisting of nylon, polyester, acetal or combinations thereof.

* * * * *